INVENTORS
ANDREW N. SMITH
ROBERT R. OLIVER

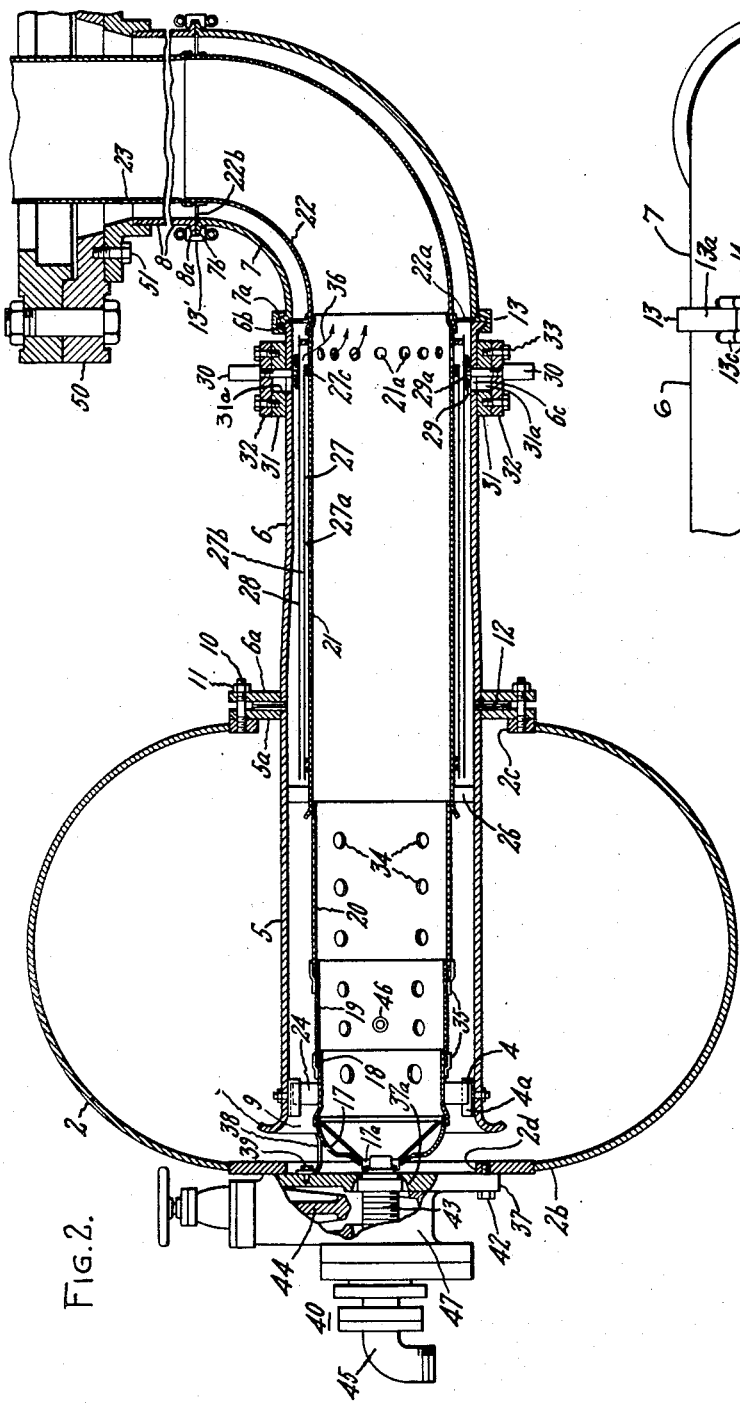

United States Patent Office 2,830,438
Patented Apr. 15, 1958

2,830,438

COMBUSTOR ASSEMBLY FOR A GAS TURBINE POWERPLANT

Andrew N. Smith, Scotia, and Robert R. Oliver, Schenectady, N. Y., assignors to General Electric Company, a corporation of New York Application November 9, 1956, Serial No. 621,228

6 Claims. (Cl. 60—39.69)

This invention relates to gas turbine powerplants, particularly to one of the "regenerative" type comprising a compressor, heat exchanger or "regenerator," combustion system, and turbine.

In the design of gas turbine powerplants, and particularly where the turbines are for a mobile application such as a ship, the physical size of the plant is a major concern due to the limited space available. The space problem becomes even more acute when the regenerative type of gas turbine is used since the "header" or common air supply chamber for a plurality of combustors normally used in such a turbine to receive the air from the regenerator (which is a heat exchanger that utilizes turbine exhaust gases to raise the temperature of the air before distribution to the combustion system) requires substantial space which is at a premium. Furthermore, when the gas turbine is continuously used as a primary source of power over a long period of time, as in a ship, it is very important that the fuel nozzles be replaceable without shutting down the plant. Also, if it becomes necessary to shut down the turbine, as for instance due to a defect in the combustion liners or the high temperature piping leading to the turbine, it is desirable that these various components be assembled in such a manner that they can be readily disassembled and replaced to limit the shutdown time as much as possible.

Accordingly, it is an object of this invention to provide an improved compact combustion assembly which reduces the vertical space or "head-room" necessary to install a gas turbine powerplant of the regenerative type.

Another object is to provide a combustion system with increased length of flow path from fuel spray nozzle to turbine inlet, to increase the time available for burning of residual fuel oils and to obtain uniform temperature distribution in the resulting hot gases.

A further object is to provide a combustion system in which the various components thereof can be readily disassembled and replaced, for inspection and servicing of the high temperature components.

Still another object is to design a combustion system in which the fuel nozzle assembly may be replaced without having to disassemble or even shut down the turbine.

Other objects and advantages will become apparent from the following description taken in connection with the accompanying drawings, in which Fig. 1 is a perspective view partly in section of the combustion system and turbine assembly of the powerplant;

Fig. 2 is a section taken along the lines 2—2 of Fig. 1; and

Fig. 3 is a view taken along the lines 3—3 of Fig. 2.

Figure 1:
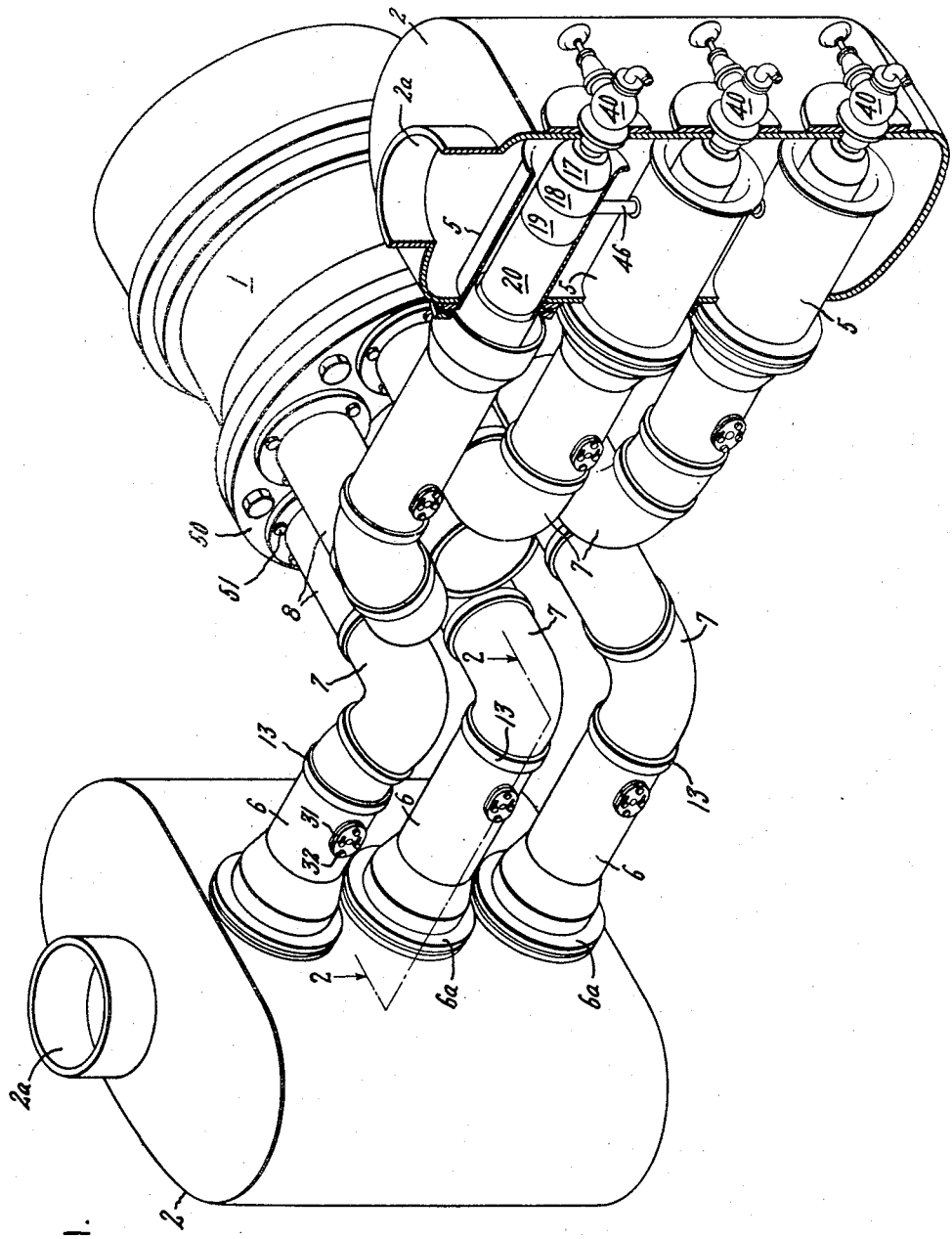

Generally stated, the invention relates to reducing the vertical space required by the combustion system of a regenerative gas turbine powerplant by locating the combustion chambers in the header serving as a common air supply chamber for a group of combustors; permitting replacement of the fuel nozzle assemblies without requiring the turbine to be shut down by locating them on the outer wall of the header, and constructing and arranging the header and combustor so that the combustion chamber parts are readily accessible for inspection, servicing or replacement.

Referring to Fig. 1, there is disclosed six combustors divided into two diametrically opposed groups of three, for providing motive fluid to the gas turbine casing 1. The cylindrical air supply casings and liners defining the initial combustion spaces are supported within vertically disposed elliptical or cylindrical headers 2 located on opposite sides of the turbine casing; and downstream portions of the combustors extend through a 90° turn to the turbine assembly 1 where they are secured to casing member 50 by bolts 51. The headers 2 serve as a common air plenum chamber for the combustors located therein. The cylindrical combustor units extend transversely across the vertical air supply header 2 in a direction generally normal to the axis of the turbine casing 1, and each consists of a cylindrical outer housing 5 supported by the wall portion 2c of the header nearest the axis of the turbine, and a cylindrical inner liner assembly which is concentrically supported within the outer housing (see Fig. 2). The headers 2 have inlet openings 2a for receiving heated compressed air from a regenerator (not shown). Thus, by disposing the combustors in two groups at either side of the turbine casing, the vertical space required is kept to a minimum, and the overall width of the powerplant may be limited to that required by the length of the flow path of the motive fluid found to be required for most advantageous combustion and temperature distribution conditions, and no additional width is required when a header serving as a common air supply chamber for a group of combustors is used. While it is apparent that a somewhat larger diameter header is needed when the combustor casings are partially located therein, the flattened elliptical cross-section shape of the header helps to reduce the overall width of the assembly.

The individual combustion chambers are provided with suitable fuel nozzles 43, and spark plugs, and other conventional accessories such as "flame detectors" (not shown), the details of which are not important to an understanding of the present invention. It may be noted, however, that the fuel spray nozzles are suitable for burning heavy residual fuel oils, and may be as disclosed in the U. S. patent to F. J. Neugebauer et al., 2,801,134, issued July 30, 1957, and assigned to the assignee of the present application.

As can be seen more clearly in Fig. 2, the combustor assembly consists of an outer housing made up of substantially cylindrical sections 5, 6, 8 and a 90° elbow 7. Section 5 is located within header 2 and defines at its left-hand end a flaring inlet portion 5b spaced from header wall 2b to define a smooth annular inlet for air flowing from the header into the annulus 9 defined between the outer housing 5 and inner liner assembly 18, 19, 20. Outer housing section 5 has welded thereto, at its right hand end, a radially extending flange portion 5a which is positively secured to header wall 2c by a circumferential row of studs 10 and nuts 11. Housing section 6 is secured to header wall 2c and section 5 by studs 10 extending through the radially extending flange 6a welded to section 6, and nuts 11. Sections 5 and 6 are axially located relative to each other by a suitable number of shims 12 located between flanges 5a, 6a. Section 6 at its right-hand end defines a flange portion 6b which is connected to flange 7a of elbow 7 by a "clamp band" assembly as indicated generally at 13. The clamp band consists of annular band sections 13a, 13b which have inwardly facing channel portions adapted to surround and engage the flanges 6b, 7a. Suitable tightening devices, such as a pair of bolts 14 are arranged through lugs 13c at the split ends of band 13a, 13b so that by tightening the bolts 14, the band can be secured to firmly engage the flanges 6b, 7a (Fig. 3). Such clamp band assemblies are well known to those skilled in the mechanical arts and the details need not be further described. The adjacent ends 7b, 8a of outer housing sections 7, 8 respectively are connected together in the same manner by a similar clamp band assembly 13'. Outer housing section 8 is secured to the turbine casing member 50 by bolts 51.

The combustion liner which defines the combustion space proper consists of an end dome assembly 17 telescopically arranged within a first substantially cylindrical liner section 18. The end dome proper is a substantially hemispherical shell having a central portion defining an opening adapted to snugly receive the nozzle 43. The liner section 18 is disposed in telescopic relation with the succeeding liner section 19. The end dome 17 is located in place by brackets 38 which are welded to the end dome and bolted to plate 37 by bolts 39. Liner sections 18, 19 and 20 are connected together as a unit by brackets 35. The liner sections 20, 21, 22 and 23 are disposed in slidable telescopic relation with adjacent liner sections in a manner which will be obvious from the drawing. The liner and end dome may be of any suitable construction, for instance the type disclosed generally in the U. S. Patent to B. O. Buckland, 2,547,619, issued April 3, 1951 and assigned to the same assignee as the present invention. It is characteristic of this type of combustor that only comparatively small amounts of air, for cooling and insulating purposes, enter the combustion space through the end cap 17. The primary and secondary combustion air flows from the header 2 into the annulus 9 and is admitted into the combustion space through a plurality of longitudinal rows of circular ports 34. Part of the air in annulus 9 also flows toward the discharge end of the combustor unit to prevent destructive overheating of the outer housing and the liner. For more complete description of the arrangement of these ports and the method of operation of such a combustor, attention is directed to Nerad Patent 2,601,000, issued June 17, 1952 and assigned to the same assignee as the present invention.

The liner section 18 is concentrically located relative to the outer housing 5 by a pair of diametrically opposed supports 24 which are slidably disposed in a slot 4a in bolt head 4 secured to outer housing section 5. The advantages of this construction are referred to in the method of disassembly to be later described. Liner section 21 is slidably disposed relative to outer housing 5 by brackets 26 which are secured to liner section 21 and engage outer housing 5, without being fastened thereto. Liner section 22 has secured thereto radially extending flanges 22a, 22b which are located between flanges 6b, 7a and 7b, 8a respectively to positively locate the inner liner section 22 relative to elbow 7.

It is observed that the combustion air flowing in annulus 9 serves to cool the outer housing section 5. However, downstream of liner section 20 the amount of cooling air is substantially reduced, and to reduce the heat radiation from the inner liner to the outer housing sections 5 and 6 a radiation shield 27 is provided between the outer housing 6 and liner section 21. The space 27a between the radiation shield 27 and the liner 21 is evacuated and sealed off by annular sealing rings 27c welded between shield 27 and liner 21 from the air flowing between the liner 21 and outer housing sections to reduce flow of heat to the outer housing 6. Also provided between the liner 21 and housing 6 is an intermediate cylindrical radiation shield 28 which is secured at its right-hand end to liner 21 and which serves as a further means of limiting the flow of heat from the inner liner section to the outer housing. The space 27b between radiation shields 28 and 27 is open to the air flowing in annulus 9 to more effectively cool the space therein. The cooling air flowing in space 27b is returned to the main flow path through openings 21a in liner section 21 as illustrated by the arrows 36.

The intermediate combustor assembly, consisting of liner 21, shield 27, and shield 28 is adapted to be moved by a pair of rods 30 located on diametrically opposite sides of liner 21. Rods 30 are threadedly connected to plates 32 and extend through axially extending grooves 31a in plate 31 (see Fig. 3), aligned opening 6c in housing 6 and into slot 29a in plate 29. Plate 29 is secured to the outer surface of shield 28 and plate 31 is secured to outer housing 6 by welding or other equivalent means. Plate 32 is fastened to plate 31 by bolts 33. The bolts 33 located on opposite sides of slot 31a are disposed in slots 32a formed in member 32 for reasons which will be obvious from the method of disassembly to be described later.

Secured to the outer wall 2b of header 2 by bolts 42 is a fuel nozzle assembly 40 for supplying a fuel spray to the inner combustion liner. Fuel nozzle assembly 40 includes a nozzle 43 which extends through an opening 17a in the end dome assembly 17. The nozzle extends through an opening 2d in the header wall 2b, which is the header wall portion remote from the turbine, and which is large enough to permit removal of the combustor line sections 18, 19, 20 and end dome 17, as a unit. The nozzle 43 is located in a housing 47 which also contains a gate valve 44. Nozzle 43 may be retracted out of openings 17a, 37a, and the gate valve 44 closed to prevent the escape of hot gases through port 37a from the combustion chamber while the turbine is operating. The flow of fuel oil and atomizing air to the nozzle through conduit 45 is discontinued when this operation takes place. Thus it can be appreciated that the invention facilitates location of the fuel nozzle so that it can be readily removed and replaced without shutting down the turbine. The specific construction and arrangement of the retractable fuel nozzle assembly is more particularly described in the U. S. patent to A. N. Smith et al., No. 2,804,917, issued September 3, 1957 and assigned to the assignee of the present invention.

Interconnecting the respective combustors are a plurality of "cross-ignition tubes" 46 (Fig. 1) which interconnect adjacent combustion spaces. Such a cross-ignition tube arrangement, and the purpose it serves, are described more fully in U. S. patent to D. R. Streid, 2,432,-359, issued December 9, 1947 and assigned to the same assignee as the present invention.

The method of disassembly of the outer casing and inner liner of the combustors is as follows. First, bolts 33 at the ends of slot 31a are removed and the bolts 33 located in slots 32a are loosened to permit rods 30 to be moved to the left in slot 31a to move the intermediate liner assembly consisting of shield 28, shield 27 and inner liner 21 to the left along with plate 32. Liner section 21 is thus telescoped over liner 20 and section 21 is disengaged from adjacent liner section 22. Clamp band assemblies 13, 13' are then removed to permit withdrawal of sections 7 and 22 from the combustion assembly. Bolts 51 can then be removed if replacement of sections 23 and 8 is required. Outer housing sections 6 can be removed by removing nuts 11 from studs 10. Turning now to the left-hand wall 2b of header 2, it can be seen that after the spark plugs (not shown) and cross-ignition tubes 46 are removed, the threaded fastenings 42 which secure the nozzle assembly 40 to header wall 2b can be removed to permit removal of the entire nozzle assembly 40 and end cap 17 (which is secured to plate 37). With the plate 37 removed, the interconnected liner sections 18, 19, 20 can be moved out of groove 4a and through header opening 2d. It is apparent therefore that these initial liner sections 18, 19, 20, which have shorter life than the downstream sections 21, 22, 23, are easily replaceable, and only a minimum shutdown time is required during changeover. Outer casing section 5 may be removed in the manner identical to section 6 since the outer diameter of flange 5b is less than the opening in wall 2c to which flange 5a is secured.

Thus it can be seen the applicants' novel invention provides a regenerative type gas turbine having a combustion system in which a considerable amount of head-room space is saved by locating the combustors in two diametrically opposed groups, with a portion of the combustor assembly disposed within the header which serves as the common air supply chamber for the group of combustors. Furthermore, this construction permits ready removal and replacement of the fuel nozzle assembly, without requiring the turbine to be shut down. Also, the novel connecting means for the housing sections facilitates removal and replacement of the liner and outer casing sections within a very short time.

While a preferred form of our combustion system has been described herein, it will be obvious to those skilled in the art that many of the details may be modified in various ways without departing from the invention, and it is intended to cover by the appended claims all such modifications as fall within the true scope of the invention.

What we claim as new and desire to secure by Letters Patent of the United States is:

1. A combustion system for a thermal powerplant having a first casing member for supporting one end of a plurality of combustors and defining a first set of spaced openings for receiving hot motive fluid from the respective combustors, a header defining a common air supply chamber for a group of combustors and having a first support wall portion defining a second set of spaced openings through which the respective combustors extend, the header having also a second wall portion disposed opposite said first wall portion and defining a third set of openings in alignment respectively with said second set of openings, each combustor comprising an end dome located within the header and having a first end portion defining a central opening adjacent said second wall portion and a second end portion defining an open end remote from the second wall portion, a fuel nozzle assembly secured to the second wall portion and comprising fuel injecting means extending through one of the third set of openings and into the central opening defined by the end dome for spraying fuel thereinto, a liner assembly having a first end portion communicating with the open end of the end dome and forming at the other end a discharge opening for hot reaction products, means supporting the end dome relative to the liner assembly, a cylindrical outer combustor housing member having one end spaced from the second wall portion to define an annular air inlet, the outer housing member surrounding the liner in radially spaced relation therefrom to define an annular air supply passage, first fastening means securing a first end of the outer housing to the first casing member, second fastening means securing a spaced portion of the outer housing to the first support wall portion of the header, and means supporting the inner liner assembly within the outer housing in radially spaced relation therewith.

2. In a combustion system for a thermal powerplant having a casing member defining a plurality of openings, a header defining a common air supply chamber and having a first support wall defining a plurality of first openings, a second support wall located opposite said first wall and defining second openings aligned with said first openings, a plurality of combustors secured within said header and extending between the header and said casing member, each combustor assembly comprising an end dome located within the header adjacent said second wall, said end dome having a first end portion defining a central opening adjacent the second wall and a second open end portion remote from the second wall, a fuel nozzle assembly secured to the second wall and having fuel injecting means extending through a second opening into the central opening of the end dome, means supporting the end dome from said fuel nozzle assembly, an intermediate liner assembly disposed within the header and having at one end a portion surrounding the adjacent open end of the dome assembly, and a discharge end liner assembly having one end portion communicating with the adjacent end of the intermediate liner assembly and forming at the other end a discharge opening for hot reaction products, a cylindrical outer combustor housing surrounding the intermediate and discharge end liner assemblies in radially spaced relation therefrom and having one end spaced axially from the second wall to define an annular air inlet, first fastening means securing the outer housing to the casing member, second fastening means securing the outer housing to the first header support wall, means slidably supporting the intermediate liner assembly relative to the outer housing in radially spaced relation therewith, and means securing the discharge liner assembly to the outer housing in radially spaced relation, the relative dimensions of the intermediate liner assembly and opening in said header second wall portion being so related that with the nozzle assembly removed, the intermediate liner assembly may be removed as a unit.

3. In combustion apparatus for a thermal powerplant, the combination of a common header forming an air supply plenum chamber for a plurality of combustors, said header having a first substantially plane wall portion defining a first set of spaced openings, the header having a second substantially plane wall portion opposite from and substantially parallel to said first wall portion and defining a second set of spaced openings aligned with said first set of openings respectively, a combustor assembly disposed through each of said first set of openings and comprising a first generally cylindrical outer housing member having a first end portion secured to the first wall portion of the header and a second end portion spaced from the second wall portion to define an annular air inlet opening, a second generally cylindrical outer housing member having a first end portion secured to the first wall portion and communicating with the adjacent end of said first housing member, a cylindrical liner assembly disposed coaxially within the first and second outer housing members and spaced radially therefrom to define an annular air supply passage, said liner assembly comprising an end dome member having a central opening disposed substantially in the plane of the second header wall portion and an open end portion disposed substantially in the plane of the air inlet end of the first outer housing member, a first cylindrical liner assembly supported coaxially within the first outer housing member with a first end portion communicating with the open end of said dome, a second liner assembly supported coaxially within the second outer housing member and having one end portion communicating with the discharge end of the first liner assembly, means for supporting the other end of the second liner assembly at a location adjacent the end of the second housing assembly remote from the header, and a fuel spray nozzle assembly secured to the outer side of the second header wall portion and having a fuel spray nozzle disposed in the central opening of the end dome, the relative diameters of the inner liner assembly and the second set of openings being such that the liner assembly may be removed therethrough after disassembly of the fuel nozzle assembly.

4. In a combustion system for a gas turbine having a casing with a first annular supporting member located in a plane normal to the axis of the turbine and defining a first set of spaced openings for receiving hot motive fluid, at least one header defining a common air supply chamber for a plurality of combustors disposed at one side of the turbine casing and spaced transversely away therefrom, said header having a second support wall portion located substantially parallel to the axis of the turbine, the header having a third support wall portion opposite said second wall portion, the second wall portion defining a second set of spaced openings each adapted to receive a combustor assembly; the third wall portion defining a third set of openings aligned with said second set of openings, a combustor assembly comprising an end dome disposed within the header and having a first end portion defining a central opening located substantially in the plane of said third wall portion and a second cylindrical open end portion remote from the third wall portion, a fuel nozzle assembly secured to the exterior side of the third wall portion and comprising fuel injecting means extending through said third opening and the central opening of the end dome for spraying fuel thereinto, a first liner assembly of circular cross-section disposed in the header with one end in telescopic relation with the second end portion of the end dome, and a second liner assembly of circular cross-section having a first end portion telescopically engaging the adjacent end of said first liner assembly, the other end of said second liner assembly discharging into the first opening defined by the first annular casing member, means supporting the end dome assembly relative to the first liner assembly, a first cylindrical outer housing surrounding the first liner assembly in radially spaced relation therefrom, said outer housing having one end portion spaced from the third header wall portion to define an annular inlet for admitting air into the annular air supply passage formed between the outer housing and the first liner, fastening means securing the other end of the first outer housing to the second support wall portion, a second cylindrical outer housing surrounding the second liner assembly, fastening means securing one end of the second outer housing to the second support wall portion, and means securing the other end of the second outer housing to the first annular support wall to discharge hot motive fluid into one of the first-mentioned openings therein.

5. In a combustion system for a gas turbine powerplant having a generally cylindrical casing with an annular casing member located in a plane substantially normal to the axis of the turbine and defining a plurality of circumferentially spaced openings for receiving hot motive fluid, a header forming a common air supply chamber spaced from one side of the turbine casing, the header having a first support wall portion disposed substantially parallel to the axis of the turbine and defining a first set of spaced openings, the header having also a second wall located opposite said first wall portion and having a second set of spaced openings in alignment with said first set of openings, a plurality of cylindrical combustor assemblies disposed within said header, each combustor assembly comprising an end dome located within the header and having a first end portion disposed substantially in the plane of the second wall portion and defining a central opening in alignment with the second wall portion opening and a cylindrical open end portion remote from said second wall portion, a fuel nozzle assembly comprising fuel injecting means extending through said second wall portion opening and the central opening of the end dome for supplying fuel thereinto, removable fastening means securing the fuel nozzle assembly to the exterior surface of the second wall, a first intermediate liner assembly of circular cross section having at one end a portion communicating with the adjacent open end portion of the end dome, means supporting the end dome relative to the first intermediate liner assembly, a second intermediate liner assembly having at one end a portion communicating with the adjacent open end of the first intermediate liner assembly, and a discharge end liner assembly of circular cross section having one end portion communicating with the adjacent end of the second intermediate liner assembly and forming at the other end a discharge opening for hot reaction products, an outer combustor housing including a first cylindrical section surrounding the intermediate liner assemblies in radially spaced relation therefrom and having a first end portion secured by first fastening means to the first support wall and a second end portion located substantially in the plane of the intersection of the second intermediate liner section with the discharge end liner assembly, a second cylindrical outer housing section surrounding in radially spaced relation the discharge end liner assembly, the second outer housing section having a first end portion secured by second fastening means to the second end portion of the first cylindrical outer housing section and a second end portion secured by third fastening means to the annular turbine casing member to discharge hot fluid into one of the openings therein, means slidably supporting the intermediate liner assemblies from the first cylindrical outer housing section in radially spaced relation therewith, means securing the discharge liner assembly to the second cylindrical outer housing section in radially spaced relation therewith, and fourth fastening means for releasably securing the second intermediate liner assembly to the discharge liner assembly, the relative dimensions of the discharge liner assembly and second outer housing section being so related that with the second and third fastening means removed, and the fourth fastening means disengaging the second intermediate liner assembly from the discharge liner assembly, the second outer housing section and discharge liner assembly may be removed as a unit.

6. In combustion apparatus for a thermal powerplant, the combination of a common header defining a common air supply chamber for a plurality of combustors, the header comprising a first support wall comprising a first set of spaced openings, and a second support wall opposite the first wall portion defining a second set of spaced openings in alignment respectively with the first set of spaced openings, a combustor assembly disposed through each of the first set of openings and comprising an outer housing assembly secured to one of the header walls and having an end portion spaced from the second header wall to define an annular air inlet opening, a liner assembly disposed within the outer housing and spaced radially therefrom to define an annular air supply passage, the liner assembly defining at one end portion within the header an end dome and at its other end extending outside the header a discharge opening for hot reaction products, means supporting the liner assembly relative to the outer housing member, and a fuel nozzle assembly removably secured to the second header wall and extending through the second openings to supply fuel to the liner assembly.

References Cited in the file of this patent

UNITED STATES PATENTS 2,778,192    Kroon   ------------------ Jan. 22, 1957